United States Patent Office 3,502,700
Patented Mar. 24, 1970

3,502,700
17-ESTERS OF 9α,21-DIHALO-11β,17α-DIHYDROXYPROGESTERONES
Gerald W. Krakower, Elizabeth, and Patrick A. Diassi, Westfield, N.J., assignors to E. R. Squibb & Sons, Inc., New York, N.Y., a corporation of Delaware
No Drawing. Filed Jan. 19, 1967, Ser. No. 610,246
Int. Cl. C07c 169/30, 169/36; A61k 17/06
U.S. Cl. 260—397.45                5 Claims

ABSTRACT OF THE DISCLOSURE

This invention relates to new 17-esters of 9α,21-dihalo-11β,17α-dihydroxyprogesterone, which are physiologically active steroids that possess progestational activity. The new steroids are prepared by interacting at 21-alkanesulfonic acid ester of the corresponding 17-ester of 9α-halo-11β,17α,21-trihydroxyprogesterone with an alkali metal halide.

---

This invention relates to new chemical compounds, and more particularly to new steroids of the Formula I:

(I)
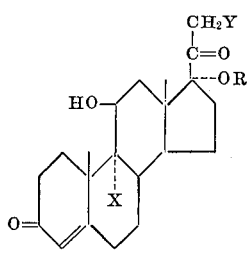

wherein X is halo (preferably chloro and fluoro), Y is halo (preferably chloro, bromo and iodo) and R is the acyl radical of a carboxylic acid, preferably the acyl radical of a hydrocarbon carboxylic acid of less than thirteen carbon atoms, as exemplified by the alkanoic acids (e.g., acetic, propionic, butyric, enanthic and lauric acid), the alkenoic acids, the monocyclic aryl carboxylic acids (e.g., benzoic and m-toluic acid), the monocyclic aryl lower alkanoic acids (e.g., phenylacetic and β-phenylpropionic acid), the cycloalkanecarboxylic acids and the cycloalkenecarboxylic acids. Preferably, R is lower alkanoyl and optimally acetyl.

The steroids of Formula I are physiologically active substances that possess progestational activity. Thus, the steroids of Formula I can be used for conception control, for which purpose they are administered to mammals, such as cattle or sheep, perorally in a suitable from (e.g., tablets) or mixed with feed in a dose of about ½ mg. to about 20 mg. In addition the steroids of Formula I can be used in lieu of known progestational agents, such as progesterone, in the treatment of habitual abortion. For this purpose, they can be administered in the same manner as progesterone, for example, the dosage being adjusted for the relative potency of the particular steriod. The compounds of this invention can also be administered perorally in the form of tablets.

In accordance with the process of this invention, the steroids of Formula I are prepared by treating a compound of the Formula II:

(II)
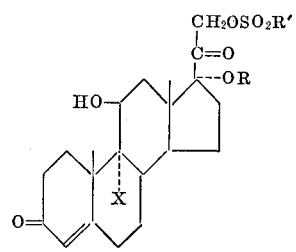

wherein X and R are as hereinbefore defined and R' is lower alkyl, with an alkali metal halide, such as lithium chloride, lithium bromide, sodium iodide, etc., in a neutral solvent. The reaction is preferably carried out at an elevated temperature such as the reflux temperature of a solution of the steroid in an organic solvent, such as dimethylformamide and acetone.

Compounds of Formula II can be prepared as described in our patent application, Ser. No. 603,424, filed Dec. 21, 1966, now abandoned. Suitable compounds include the 21-(lower alkane)sulfonic acid esters of 17-esters of 9α-chloro-11β,17α,21-trihydroxyprogesterone and 9α-fluoro-11β,17α,21-trihydroxyprogesterone with hydrocarbon carboxylic acids of less than thirteen carbon atoms; e.g., the acetic, propionic, butyric, enanthic, lauric, undecenoic, benzoic, m-toluic, phenylacetic, β-phenylpropionic, cyclohexanecarboxylic and cyclohexenecarboxylic acids. The preferred lower alkane sulfonic acid is methanesulfonic acid.

The following examples illustrate the invention (all temperatures being in centigrade):

EXAMPLE 1

17α-acetoxy-21-chloro-9α-fluoro-11β-hyroxy-progesterone

A solution of 200 mg. of 17α-acetoxy 9α-fluoro-11β-hydroxy-21-methanesulfonyloxyprogesterone in 10 ml. of dimethylformamide containing 60 mg. of lithium chloride is refluxed for 45 minutes. The cooled reaction mixture is diluted with water and the resulting crystals filtered and dried to give about 132 mg. of 17α-acetoxy-21-chloro-9α-fluoro-11β-hydroxy-progesterone, M.P. about 258–259° (dec.). The analytical sample has M.P. about 256–257° (dec.), $[\alpha]_D$ +91° (chloroform).

Analysis.—Calc'd for $C_{23}H_{30}O_5ClF$ (percent): C, 62.65; H, 6.86; Cl, 8.04. Found (percent): C, 62.76; H, 6.76; Cl, 8.34.

EXAMPLE 2

17α-acetoxy-21-bromo-9α-fluoro-11β-hydroxyprogesterone

A solution of 200 mg. of 17α-acetoxy-9α-fluoro-11β-hydroxy-21-methanesulfonyloxyprogesterone and 400 mg. of lithium bromide in 4 ml. of acetone is refluxed for 46 hours. The reaction mixture is cooled and diluted with water to precipitate the reaction product. The resulting crystals are collected and dried to give about 169 mg. of crude material, M.P. about 212–213°. Three recrystallizations from methanol give analytically pure 17α-acetoxy-21-bromo-9α-fluoro-11β-hydroxyprogesterone, M.P. about 237–238°, $[\alpha]_D$ +104° (chloroform).

*Analysis.*—Calc'd for $C_{23}H_{30}O_5BrF$ (percent): C, 56.91; H, 6.23; Br, 16.46. Found (percent): C, 56.86; H, 6.32; Br, 16.46.

EXAMPLE 3

17α-acetoxy-9α-fluoro-11β-hydroxy-21-iodoprogesterone

A solution of 500 mg. of 17α-acetoxy-9α-fluoro-11β-hydroxy-21-methanesulfonyloxyprogresterone and 1.50 g. of sodium iodide in 15 ml. of acetone is refluxed for 21 hours. The cooled reaction mixture is diluted with water and filtered to give about 256 mg. of crystalline material. Thin layer chromatography of this material on silica gel H (chloroformethyl acetate 2:1) shows the presence of 2 bands in ultraviolet light. The less polar band when eluted with ethyl acetate gives about 203 mg. of material which on recrystallization from methanol gives about 128 mg. of product, M.P. about 153–155°. The analytical sample of 17α-acetoxy-9α-fluoro-11β-hydroxy-21-iodoprogesterone has M.P. about 153–155°, $[\alpha]_D$ +109° (chloroform).

*Analysis.*—Calc'd. for $C_{23}H_{30}O_5FI$ (percent): C, 51.89; H, 5.68; I, 23.84. Found (percent): C, 52.77; H, 5.88; I, 24.16.

Similarly, by following the procedures of Examples 1 through 3, but substituting 17α-acetoxy-9α-chloro-11β-hydroxy - 21 - methanesulfonyloxyprogresterone for the steroid reactant, the corresponding 17α-acetoxy-9α-chloro-11β-hydroxy-21-haloprogresterones are formed.

Moreover, if another 17-ester is substituted for the 17-acetates used in the examples, the corresponding 17-ester derivatives are formed.

In addition to their use as physiologically active substances, the new steroids of this invention can be used as intermediates in the preparation of the corresponding 21-unsubstituted steroids, compounds disclosed in our said application, Ser. No. 603,424, filed Dec. 21, 1966. To effect this conversion, the 21-halo steroid is heated with sodium bisulfite as more fully disclosed in the following example:

EXAMPLE 4

17α-acetoxy-9α-fluoro-11β-hydroxyprogesterone

A solution of 95 mg. of 17α-acetoxy-9α-fluoro-11β-hydroxy-21-iodoprogesterone in 5 ml. of dioxane and 5 ml. of 5% sodium bisulfite is heated on the steam bath for 4 hours. The dioxane is evaporated and the aqueous suspension filtered to give about 67 mg. of 17α-acetoxy-9α-fluoro-11-β-hydroxyprogresterone, M.P. about 256–257°.

What is claimed is:

1. A compound of the formula:

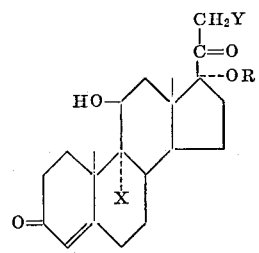

wherein X is chloro or fluoro and Y is chloro, bromo or iodo and R is the acyl radical of a hydrocarbon carboxylic acid of less than thirteen carbon atoms.

2. The compounds of claim 1, wherein R is acetyl.

3. The compounds of claim 1 having the name 17α-acetoxy-21-chloro-9α-fluoro-11β-hydroxyprogresterone.

4. The compound of claim 1 having the name 17α-actoxy-21-bromo-9α-fluoro-11β-hydroxyprogesterone.

5. The compound of claim 1 having the name 17α-acetoxy-9α-fluoro-11β-hydroxy-21-iodoprogesterone.

References Cited

UNITED STATES PATENTS

| | | | |
|---|---|---|---|
| 2,763,671 | 9/1956 | Fried et al. | 260—397.45 |
| 2,838,539 | 6/1958 | Magerlein et al. | 260—397.45 |
| 2,892,851 | 6/1959 | Bergstrom et al. | 260—397.45 |
| 3,152,154 | 10/1964 | Ercoli et al. | 260—397.45 |
| 3,239,544 | 3/1966 | Magerlein et al. | 260—397.45 |

ELBERT L. ROBERTS, Primary Examiner

U.S. Cl. X.R.

260—999